(12) United States Patent  
Aoki

(10) Patent No.: US 9,440,223 B2  
(45) Date of Patent: Sep. 13, 2016

(54) EXHAUST GAS PURIFICATION CATALYST

(71) Applicant: Yuki Aoki, Nisshin (JP)

(72) Inventor: Yuki Aoki, Nisshin (JP)

(73) Assignee: Toyota Jidosha Kabushiki Kaisha, Toyota-shi, Aichi-ken (JP)

( * ) Notice: Subject to any disclaimer, the term of this patent is extended or adjusted under 35 U.S.C. 154(b) by 5 days.

(21) Appl. No.: 14/369,217

(22) PCT Filed: Dec. 26, 2012

(86) PCT No.: PCT/JP2012/008343  
§ 371 (c)(1),  
(2) Date: Jun. 27, 2014

(87) PCT Pub. No.: WO2013/099251  
PCT Pub. Date: Jul. 4, 2013

(65) Prior Publication Data  
US 2014/0357480 A1 Dec. 4, 2014

(30) Foreign Application Priority Data  
Dec. 28, 2011 (JP) ................................. 2011-288798

(51) Int. Cl.  
*B01J 21/00* (2006.01)  
*B01J 21/04* (2006.01)  
(Continued)

(52) U.S. Cl.  
CPC .............. *B01J 23/63* (2013.01); *B01D 53/945* (2013.01); *B01J 23/002* (2013.01); *B01J 23/44* (2013.01); *B01J 23/464* (2013.01);  
(Continued)

(58) Field of Classification Search  
CPC .......... B01J 23/10; B01J 23/44; B01J 23/46; B01J 23/56; B01J 21/00; B01J 21/06  
USPC ........ 502/262–263, 302–304, 327, 332–334, 502/339, 349, 439, 527.12, 527.1, 3  
See application file for complete search history.

(56) References Cited

U.S. PATENT DOCUMENTS 4,153,579 A * 5/1979 Summers ............. B01D 53/945  
                                                                                    423/213.5  
5,177,041 A * 1/1993 Horiuchi ............. B01D 53/944  
                                                                                   505/242  
(Continued)

FOREIGN PATENT DOCUMENTS

CN             102076407 A      5/2011  
JP             2009-11937       1/2009  
(Continued)

*Primary Examiner* — Cam N. Nguyen  
(74) *Attorney, Agent, or Firm* — Finnegan, Henderson, Farabow, Garrett & Dunner, LLP

(57) ABSTRACT

An exhaust gas purification catalyst is provided with a substrate and a catalyst coating layer formed on the surface of the substrate. The catalyst coating layer is formed into a layered structure having upper and lower layers, with a lower layer being closer to the surface of the substrate and an upper layer being relatively farther therefrom. The catalyst coating layer is provided with Rh and Pd as precious metal catalysts and is provided with an OSC material having an oxygen storage capacity as a support. The Rh is disposed in the upper layer of the catalyst coating layer, and the Pd is disposed in both the upper layer and the lower layer of the catalyst coating layer. At least a portion of the Pd in the upper layer and in the lower layer is supported on the OSC material. The mass ratio of the Pd disposed in the upper layer to the Pd disposed in the lower layer is not more than 0.4.

5 Claims, 3 Drawing Sheets

(51) Int. Cl.
*B01J 23/00* (2006.01)
*B01J 23/02* (2006.01)
*B01J 23/10* (2006.01)
*B01J 23/40* (2006.01)
*B01J 23/42* (2006.01)
*B01J 23/44* (2006.01)
*B01J 23/56* (2006.01)
*B01J 23/63* (2006.01)
*B01J 37/02* (2006.01)
*B01D 53/94* (2006.01)
*B01J 37/03* (2006.01)
*B01J 35/00* (2006.01)
*B01J 23/46* (2006.01)

(52) U.S. Cl.
CPC ....... *B01J 35/0006* (2013.01); *B01J 37/0201* (2013.01); *B01J 37/0244* (2013.01); *B01J 37/038* (2013.01); *B01D 2255/1023* (2013.01); *B01D 2255/1025* (2013.01); *B01D 2255/2061* (2013.01); *B01D 2255/2065* (2013.01); *B01D 2255/908* (2013.01); *B01D 2255/9022* (2013.01); *B01J 2523/00* (2013.01); *Y02T 10/22* (2013.01)

(56) References Cited

U.S. PATENT DOCUMENTS

| | | | | |
|---|---|---|---|---|
| 5,948,723 | A * | 9/1999 | Sung | B01D 53/945 502/302 |
| 6,080,375 | A * | 6/2000 | Mussmann | B01D 53/944 423/212 |
| 6,294,140 | B1 * | 9/2001 | Mussmann | B01D 53/945 423/213.5 |
| 6,348,430 | B1 * | 2/2002 | Lindner | B01D 53/945 502/304 |
| 6,514,905 | B1 * | 2/2003 | Hanaki | B01D 53/945 502/327 |
| 6,864,214 | B2 * | 3/2005 | Uenishi | B01D 53/945 423/213.2 |
| 6,881,384 | B1 * | 4/2005 | Uenishi | B01D 53/945 422/177 |
| 6,967,186 | B2 * | 11/2005 | Takaya | B01D 53/945 505/302 |
| 7,081,430 | B2 * | 7/2006 | Uenishi | B01D 53/945 502/304 |
| 7,446,076 | B2 * | 11/2008 | Miyoshi | B01D 53/945 502/303 |
| 7,517,510 | B2 * | 4/2009 | Chen | B01D 53/945 422/168 |
| 7,550,124 | B2 * | 6/2009 | Chen | B01D 53/945 422/168 |
| 7,758,834 | B2 * | 7/2010 | Chen | B01D 53/945 423/213.2 |
| 7,759,283 | B2 * | 7/2010 | Yamato | B01D 53/944 502/261 |
| 7,816,300 | B2 * | 10/2010 | Takeuchi | B01D 53/945 423/213.5 |
| 8,039,418 | B2 * | 10/2011 | Kitamura | B01D 53/925 423/213.5 |
| 8,066,963 | B2 * | 11/2011 | Klingmann | B01D 53/944 423/212 |
| 8,168,560 | B2 * | 5/2012 | Taki | B01J 23/40 423/213.5 |
| 8,202,819 | B2 * | 6/2012 | Kohara | B01D 53/9468 422/169 |
| 8,323,599 | B2 * | 12/2012 | Nunan | B01D 53/945 423/213.2 |
| 8,337,791 | B2 * | 12/2012 | Kohara | B01D 53/945 423/213.2 |
| 8,394,348 | B1 * | 3/2013 | Nunan | B01D 53/945 423/213.2 |
| 8,551,908 | B2 * | 10/2013 | Satou | B01D 53/945 502/262 |
| 8,557,204 | B2 * | 10/2013 | Nunan | B01D 53/945 422/177 |
| 8,580,705 | B2 * | 11/2013 | Aoki | B01D 53/945 502/304 |
| 8,640,440 | B2 * | 2/2014 | Klingmann | B01D 53/944 422/170 |
| 8,663,588 | B2 * | 3/2014 | Lindner | B01D 53/945 423/213.5 |
| 8,950,174 | B2 * | 2/2015 | Hilgendorff | B01D 53/945 423/213.2 |
| 8,975,204 | B2 * | 3/2015 | Hori | B01D 53/945 502/302 |
| 2010/0087314 | A1 | 4/2010 | Kitamura et al. | |
| 2010/0135879 | A1 | 6/2010 | Roesch et al. | |
| 2011/0099987 | A1 | 5/2011 | Satou et al. | |
| 2012/0027654 | A1 * | 2/2012 | Mikita | B01D 53/945 423/213.5 |
| 2012/0055141 | A1 * | 3/2012 | Hilgendorff | B01J 23/58 60/301 |
| 2013/0029838 | A1 * | 1/2013 | Aoki | B01D 53/945 502/304 |
| 2013/0310248 | A1 | 11/2013 | Aoki et al. | |
| 2014/0038812 | A1 * | 2/2014 | Hori | B01J 23/002 502/304 |

FOREIGN PATENT DOCUMENTS

| | | |
|---|---|---|
| JP | 2010-005587 | 1/2010 |
| JP | 2010-5591 | 1/2010 |
| JP | 4751916 | 1/2010 |
| JP | 2010/521301 | 6/2010 |
| JP | 2011-183317 | 9/2011 |
| JP | 2012-40547 | 3/2012 |
| JP | 2012-152702 | 8/2012 |
| WO | WO 95/00235 | 1/1995 |

* cited by examiner

EXHAUST GAS PURIFICATION CATALYST

TECHNICAL FIELD

The present invention relates to an exhaust gas purification catalyst that purifies the exhaust gas discharged from an internal combustion engine.

This application is a national phase application of International Application No. PCT/JP2012/008343, filed Dec. 26, 2012, and claims priority from Japanese Patent Application No. 2011-288798 filed on Dec. 28, 2011, the entire contents of which are incorporated herein by reference.

BACKGROUND ART

Three-way catalysts that contain at least one precious metal selected from platinum (Pt), palladium (Pd), and rhodium (Rh) are often used for the purification of the exhaust gas discharged from an internal combustion engine such as an automobile engine (Patent Literature 1 to 3). In a typical three-way catalyst structure, a catalyst coating layer made of alumina is formed on the surface of a highly heat-resistant ceramic substrate and at least one precious metal selected from Pd, Pt, and Rh is supported in this catalyst coating layer. Of these precious metals, Pd and Pt contribute mainly to a purification capacity (oxidative purification capacity) for carbon monoxide (CO) and hydrocarbon (HC) and Rh contributes mainly to a purification capacity (reductive purification capacity) for NOx. As a result, the harmful components in exhaust gas can be efficiently purified at one time by using Rh in combination with Pd or Pt.

In order to efficiently purify the aforementioned components in exhaust gas using such a three-way catalyst, that is, in order to convert these components by oxidation or reduction into $H_2O$, $CO_2$, or $N_2$, the air/fuel ratio, which is the mixing ratio between the air and gasoline fed to the engine, must be near the theoretical air/fuel ratio (stoichiometric). A ceria-zirconia complex oxide has been widely used as the support for these precious metals in order to smooth out changes in the atmosphere from the air/fuel ratio at which the catalyst can effectively operate. This ceria-zirconia complex oxide functions to store the oxygen in the exhaust gas when the air/fuel ratio for the exhaust gas is lean (i.e., an excess oxygen atmosphere) and to release the stored oxygen when the air/fuel ratio for the exhaust gas is rich (i.e., an excess fuel atmosphere). As a consequence, a stable catalyst performance is obtained even when the oxygen concentration in the exhaust gas varies and the catalyst purification performance is improved.

In order to raise the purification performance still further, exhaust gas purification catalysts have been proposed in recent years in which the catalyst coating layer has a two-layer structure and the Pd and Rh are supported separately. All of the precious metal catalyst is not supported in a single support layer and the catalyst coating layer is formed into a layered structure having at least two layers, i.e., an upper layer and a lower layer. A support having a good affinity for Rh and a support having a good affinity for Pd can be selected by supporting the Pd with it separated into one layer and supporting the Rh with it separated in another layer. For example, $ZrO_2$ is preferred as a support for Rh. Patent Literature 1 describes an exhaust gas purification catalyst having a two-layer structure formed of an upper layer in which Rh is supported on $ZrO_2$ and a lower layer in which Pd is supported on a $CeO_2$—$ZrO_2$ complex oxide.

CITATION LIST

Patent Literature

PTL 1: Japanese Patent Application Publication No. 2011-183317
PTL 2: Japanese Patent Publication No. 4751916
PTL 3: Japanese Patent Application Publication No. 2010-005591

In exhaust gas purification catalysts having an upper layer/lower layer two-layer structure, as noted above $ZrO_2$ is preferred as the support for the Rh in the upper layer and a $CeO_2$—$ZrO_2$ complex oxide, which has an oxygen storage capacity (OSC), is preferred as the support for the Pd in the lower layer, but the Rh in the upper layer is in some cases supported on a $CeO_2$—$ZrO_2$ complex oxide when a higher OSC is required. However, the catalytic activity of Rh on $CeO_2$ is not as high as that of Rh on $ZrO_2$, and this raises the concern that Rh supported on a $CeO_2$—$ZrO_2$ complex oxide may not be able to develop the desired NOx purification capacity. Moreover, the development of low precious metal exhaust gas purification catalysts, which use a lower amount of precious metal catalyst, has been underway in recent years in order to bring down production costs and create a stable material supply situation. These low precious metal exhaust gas purification catalysts, however, have a low content of precious metal, which mediates oxygen absorption, and as a consequence the efficiency of oxygen absorption into the OSC support ends up being substantially diminished. A technology that can efficiently improve the OSC of the catalyst as a whole is also desired in order to compensate for the decline in the OSC brought about by this lowering of the precious metal content.

SUMMARY OF INVENTION

The present invention was made in view of these circumstances and, with regard to an exhaust gas purification catalyst provided with a layered structure-type catalyst coating layer, has as its principal object the introduction of an exhaust gas purification catalyst for which the OSC of the catalyst as a whole is effectively increased while a high NOx purification capacity is maintained.

With regard to an exhaust gas purification catalyst having a layered structure-type catalyst coating layer in which Pd supported on an OSC material is disposed in the lower layer and Rh is disposed in the upper layer, the inventor concluded that the OSC of the catalyst as a whole could be improved by transferring a portion of the Pd disposed in the lower layer to the upper layer, and discovered that the OSC of the catalyst as a whole could be effectively improved, without lowering the NOx purification capacity of the Rh in the upper layer, by judiciously setting the mass ratio between the Pd disposed in the upper layer and the Pd disposed in the lower layer. The present invention was achieved based on this discovery.

Thus, the exhaust gas purification catalyst provided by the present invention is an exhaust gas purification catalyst that has a substrate and a catalyst coating layer formed on a surface of this substrate. This catalyst coating layer is formed into a layered structure having upper and lower layers with the lower layer being closer to the surface of the substrate and the upper layer being relatively farther therefrom. This catalyst coating layer is provided with Rh and Pd as precious metal catalysts. The catalyst coating layer is also provided with an OSC material having an oxygen storage capacity as a support. The Rh is disposed in the upper layer of the catalyst coating layer, and the Pd is disposed in both the upper layer and the lower layer of the catalyst coating layer. At least a portion of this Pd in the upper layer and in the lower layer is supported on the OSC material. The mass ratio of the Pd disposed in the upper layer to the Pd disposed in the lower layer is not more than 0.4 (and is typically 0.01 to 0.4 and preferably 0.06 to 0.32).

Pd supported on an OSC material is disposed in both the upper layer and the lower layer in the thusly structured exhaust gas purification catalyst. By disposing this Pd supported on an OSC material not just in the lower layer, but also in the upper layer, where the exhaust gas easily diffuses, a larger opportunity for contact between the OSC material and the exhaust gas is provided in comparison to a conventional catalyst coating layer in which the Pd is disposed in only the lower layer. This makes it possible to bring about a better improvement in the OSC of the catalyst as a whole.

The mass ratio x of the Pd in the upper layer and lower layer (upper layer/lower layer) preferably satisfies $$0.01 \leq x \quad \text{[Math. 1]}$$

in the herein disclosed exhaust gas purification catalyst and more preferably satisfies $$0.06 \leq x, \quad \text{[Math. 2]}$$

even more preferably satisfies $$0.15 \leq x, \quad \text{[Math. 3]}$$

and particularly preferably satisfies $$0.2 \leq x. \quad \text{[Math. 4]}$$

When, on the other hand, this mass ratio x for Pd is too large, the Rh and Pd in the upper layer react and alloy with each other at elevated temperatures, which raises the concern that the NOx purification capacity of the Rh will be reduced and hence is disfavored. Generally $$x \leq 0.4 \quad \text{[Math. 5]}$$

from the standpoint of inhibiting alloying between the Rh and Pd, and, for example, the Pd is desirably disposed in both the upper layer and lower layer at a mass ratio x for the Pd that provides $$0.01 \leq x \leq 0.4 \quad \text{[Math. 6]}$$

(preferably $$0.06 \leq x \leq 0.32). \quad \text{[Math. 7]}$$

By doing this, the OSC of the catalyst as a whole can be more effectively increased while a higher NOx purification capacity can be maintained by the Rh in the upper layer, than for a conventional exhaust gas purification catalyst in which the Pd is disposed only in the lower layer or in which the mass ratio x for the Pd does not satisfy the range indicated above. Thus, in comparison to conventional catalysts, the present invention can provide an optimal exhaust gas purification catalyst that exhibits an excellent purification capacity, and in which the NOx purification capacity and the OSC are improved in a well-balanced manner.

In a preferred aspect of the herein disclosed exhaust gas purification catalyst, the OSC material that supports at least a portion of the Pd in the upper layer and in the lower layer is made of $CeO_2$ or a $CeO_2$—$ZrO_2$ complex oxide. $CeO_2$ and $CeO_2$—$ZrO_2$ complex oxides have a high OSC and are well suited as the OSC material used in the herein disclosed exhaust gas purification catalyst.

In a preferred aspect of the herein disclosed exhaust gas purification catalyst, the support that supports the Rh in the upper layer is made of a $ZrO_2$ complex oxide that contains $Y_2O_3$. A high NOx purification capacity can be exhibited by supporting the Rh on $ZrO_2$. In addition, the heat resistance of the $ZrO_2$ can be improved and a durable exhaust gas purification catalyst can be obtained by adding $Y_2O_3$ to the $ZrO_2$.

In a preferred aspect of the herein disclosed exhaust gas purification catalyst, the mass ratio of the Rh to the Pd disposed in the upper layer is from 1.25 to 5. This construction provides a favorable balance for the ratio between the Rh and Pd in the upper layer, and because of this an improved OSC can be reliably exhibited while alloying between the Rh and Pd is inhibited.

DESCRIPTION OF EMBODIMENTS

Preferred embodiments of the present invention are described in the following based on the figures. Matters required for the execution of the present invention, but not included in the matters particularly described in this Description (for example, general items such as those relating to the disposition of the exhaust gas purification catalyst in an automobile), can be understood as design matters for the individual skilled in the art based on the conventional art in the pertinent field. The present invention can be implemented based on the contents disclosed in this Description and the common general technical knowledge in the pertinent field. In the description that follows, an exhaust gas for a lean, stoichiometric, or rich air/fuel ratio denotes an exhaust gas that has the same air/fuel ratio as the air/fuel ratio of the exhaust gas discharged from an internal combustion engine when a lean, stoichiometric, or rich mixed gas, respectively, is combusted in the internal combustion engine, or denotes an exhaust gas provided by the post-injection of hydrocarbon into an exhaust gas that has the same air/fuel ratio as the air/fuel ratio of the exhaust gas discharged from an internal combustion engine when a lean, stoichiometric, or rich mixed gas, respectively, is combusted in the internal combustion engine.

The herein disclosed exhaust gas purification catalyst comprises a substrate, a catalyst coating layer comprising a porous support and formed on the surface of the substrate, and a precious metal catalyst supported on the porous support of the catalyst coating layer, wherein this catalyst coating layer is formed into a layered structure.

Figure 1:
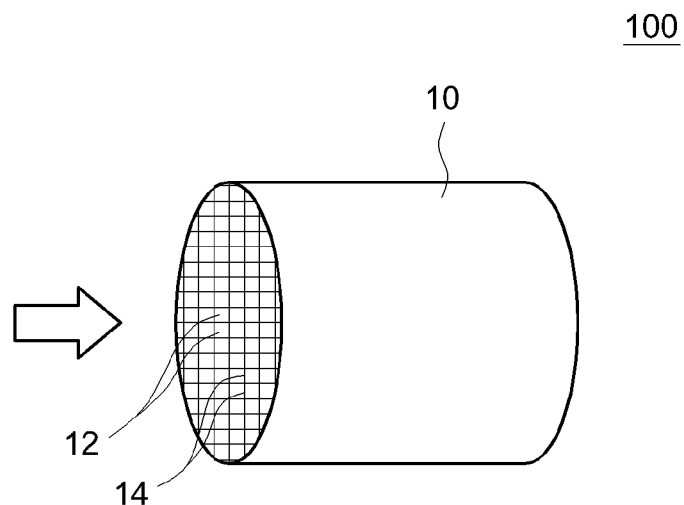
FIG. 1 is a diagram that schematically shows an exhaust gas purification catalyst according to an embodiment of the present invention.

FIG. 1 is a schematic diagram of a typical example of an exhaust gas purification catalyst. The exhaust gas purification catalyst 100 according to this embodiment is provided with a honeycomb substrate 10 that has a plurality of regularly arranged cells 12 and that has rib walls 14 that form these cells 12. In this Description, "per 1 liter of volume of the substrate" indicates per 1 L of the bulk volume of the entire article also including the volume of the cell passages in the net volume of the substrate itself. The use of (g/L) in the following description indicates the amount present in 1 liter of volume of the substrate.

The various materials and shapes heretofore used in this type of service can be used for the substrate constituting the herein disclosed exhaust gas purification catalyst. For example, a honeycomb substrate provided with a honeycomb structure formed from a ceramic, e.g., cordierite, silicon carbide (SiC), and so forth, or an alloy (e.g., stainless steel and so forth) can be suitably used. One example here is a honeycomb substrate that has a cylindrical outer shape; that is provided, along the direction of the axis of this cylinder, with through holes (cells) that function as exhaust gas passages; and that makes possible contact by the exhaust gas with the partitions (rib walls) that delineate the individual cells. In addition to a honeycomb configuration, the substrate may have, for example, a foam configuration or a pellet configuration. In addition to a cylindrical shape, an elliptical tube shape or a polyhedral tube shape may be used for the outer shape of the substrate as a whole.

<The Catalyst Coating Layer>

Figure 2:
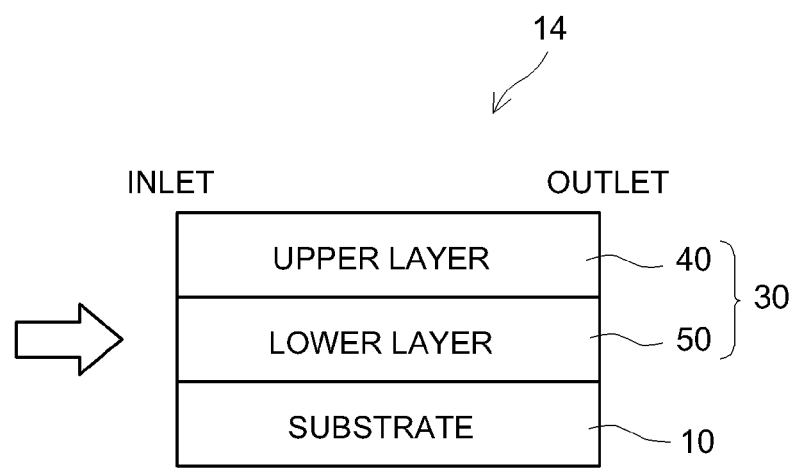
FIG. 2 is a diagram that schematically shows the structure of the rib wall region in an exhaust gas purification catalyst according to an embodiment of the present invention.

FIG. 2 is a diagram that schematically depicts the structure of the surface region of the rib wall 14 in the honeycomb substrate 10 of FIG. 1. The rib wall 14 is provided with a substrate 10 and, formed on its surface, a catalyst coating layer 30 having a two-layer structure. This two-layered catalyst coating layer 30 is formed into a layered structure having upper and lower layers in which the lower layer 50 is closer to the surface of the substrate 10 and the upper layer 40 is relatively farther therefrom. In the herein disclosed art, the catalyst coating layer 30 is provided with Rh and Pd as precious metal catalysts. The catalyst coating layer 30 is also provided with an OSC material having an oxygen storage capacity as a support. The Rh is disposed in the upper layer 40 of the catalyst coating layer 30 and the Pd is disposed on both the upper layer 40 and the lower layer 50 of the catalyst coating layer 30. At least a portion of the Pd in the upper layer 40 and in the lower layer 50 is supported on the OSC material.

In the catalyst coating layer 30 provided by the present invention, Pd supported on an OSC material is disposed not just in the lower layer 50, but also in the upper layer 40, where the exhaust gas easily diffuses. By doing this, a larger opportunity for contact between the OSC material and the exhaust gas is provided in comparison to a conventional catalyst coating layer in which the Pd is disposed in only the lower layer 50. This makes it possible to bring about a better improvement in the OSC of the catalyst as a whole. The mass ratio x for the Pd disposed in the upper layer 40 to the Pd disposed in the lower layer 50 (upper layer/lower layer) preferably satisfies $0.01 \leq x,$ [Math. 8]

more preferably satisfies $0.06 \leq x,$ [Math. 9]

even more preferably satisfies $0.15 \leq x,$ [Math. 10]

and particularly preferably satisfies $0.2 \leq x.$ [Math. 11]

The above-described increase in the OSC is inadequate when the Pd mass ratio (upper layer/lower layer) is too small.

When, on the other hand, this Pd mass ratio (upper layer/lower layer) x is too large, the Rh and Pd in the upper layer 40 may undergo a partial reaction and alloy with each other at elevated temperatures, resulting in a decline in the NOx purification capacity of the Rh, and is thus disfavored. Viewed from the perspective of preventing alloying between the Rh and Pd, preferably $x \leq 0.4$ [Math. 12]

is satisfied (for example, $x \leq 0.32$ [Math. 13]

and particularly $x \leq 0.25).$ [Math. 14]

For example, a catalyst coating layer 30 having a value of at least 0.06 but not more than 0.32 (particularly at least 0.15 but not more than 0.3) for this Pd mass ratio (upper layer/lower layer) is well suited in terms of obtaining both an increase in the OSC and an inhibition of alloying between the Rh and Pd.

<The Lower Layer>

The lower layer 50 constituting the herein disclosed catalyst coating layer 30 is provided with a support and a precious metal catalyst that contains at least Pd and is supported on the support. The Pd purifies mainly the HC and CO in the exhaust gas.

<The Support in the Lower Layer>

The support that supports the Pd in the lower layer 50 contains an OSC material that has an oxygen storage capacity. This OSC material functions to take in and store the oxygen in the exhaust gas when the air/fuel ratio for the exhaust gas is lean (i.e., an excess oxygen atmosphere) and to release the stored oxygen when the air/fuel ratio for the exhaust gas is rich (i.e., an excess fuel atmosphere). This OSC material can be exemplified by cerium oxide (ceria: $CeO_2$) and by complex oxides that contain ceria (for example, ceria-zirconia complex oxide ($CeO_2$—$ZrO_2$ complex oxide)). Variations in the oxygen concentration in the lower layer are smoothed out and a stable catalyst function is obtained by using $CeO_2$ or $CeO_2$—$ZrO_2$ complex oxide as the support for the Pd in the lower layer. A better catalyst function can be reliably realized as a result.

The use of $CeO_2$—$ZrO_2$ complex oxide is preferred among the OSC materials referenced above. By producing a solid solution of $ZrO_2$ in $CeO_2$, grain growth by the $CeO_2$ can be inhibited and the decline in the OSC post-aging can be inhibited. The mixing ratio between the $CeO_2$ and $ZrO_2$ in the $CeO_2$—$ZrO_2$ complex oxide may be $CeO_2/ZrO_2 = 0.25$ to 0.75 (preferably 0.3 to 0.6 and more preferably about 0.5). A high catalytic activity and oxygen storage capacity (OSC) can be realized in the Pd-containing lower layer 50 by bringing $CeO_2/ZrO_2$ into the indicated range.

This $CeO_2$—$ZrO_2$ complex oxide may be a $CeO_2$—$ZrO_2$ complex oxide in which another compound (typically an inorganic oxide) is admixed as an auxiliary component. For example, a rare-earth element such as lanthanum, an alkaline-earth element such as calcium, or a transition metal element may be used for this compound. Among these, a rare-earth element such as lanthanum is preferably used as a stabilizer from the standpoint of bringing about an increase in the specific surface area at elevated temperatures without poisoning the catalytic function. For example, a rare-earth oxide such as $La_2O_3$, $Y_2O_3$, or $Pr_6O_{11}$ may be admixed for the purpose of, for example, preventing sintering. This rare-earth oxide may be physically mixed as an independent oxide into the support powder or may be made into a component of the complex oxide. The content (mass ratio) of the auxiliary component is preferably 2% to 30% (for example, 3% to 6%) of the support as a whole. The effect, e.g., an inhibition of sintering and so forth, is reduced when the content of the auxiliary component is too low. When the content of the auxiliary component is too high, the amounts of $ZrO_2$ and $CeO_2$ in the support undergo a relative decline and the heat resistance and OSC may be reduced.

The support that supports the Pd in the herein disclosed lower layer 50 may contain a support material other than an OSC material, i.e., a non-OSC material. A porous, highly heat-resistant metal oxide is preferably used for this non-OSC material. Examples here are aluminum oxide (alumina: $Al_2O_3$), zirconium oxide (zirconia: $ZrO_2$), and so forth, whereamong the use of $Al_2O_3$ is preferred. $Al_2O_3$ has a smaller specific surface area and a higher durability (particularly heat resistance) than $CeO_2$—$ZrO_2$ complex oxide. As a consequence, supporting the Pd on $Al_2O_3$ can improve the thermal stability of the support as a whole and can result in the optimal amount of Pd being supported on the support as a whole. The $Al_2O_3$ and $CeO_2$—$ZrO_2$ complex oxide are preferably mixed at a mass mixing ratio ($Al_2O_3$:$CeO_2$—$ZrO_2$) in the range from 80:20 to 20:80. By using this composition, the ratio between the $Al_2O_3$ and $CeO_2$—$ZrO_2$ complex oxide takes on a suitable balance and the effect due to mixing the $Al_2O_3$ and $CeO_2$—$ZrO_2$ complex oxide (this effect is, for example, the ability to combine the capacity to absorb, store, and release oxygen possessed by the $CeO_2$—$ZrO_2$ complex oxide with the large specific surface area and high durability possessed by the $Al_2O_3$) can then be even more favorably exhibited.

Barium (Ba) may be added to the support that supports the Pd in the herein disclosed lower layer 50. Ba is added to the support in the lower layer in order to inhibit HC poisoning of the Pd and raise the catalytic activity (particularly the low-temperature activity). In addition, the dispersibility of the Pd on the support is improved and high-temperature sintering, which is accompanied by Pd particle growth, is more thoroughly inhibited. The amount of Ba addition for the herein disclosed support is preferably an amount that satisfies 5 mass % to 10 mass % with respect to the total mass of the support and particularly preferably that satisfies 5 mass % to 8 mass % with respect to the total mass of the support. Bringing the Ba content into this range provides a better inhibition of HC poisoning of the Pd and makes possible the development of a high catalytic activity even immediately after engine start. It also achieves a better inhibition of Pd sintering and an improved durability for the Pd. When the Ba content is too much larger than 10 mass % or too much smaller than 5 mass %, the improvement in the catalytic performance due to Ba addition as described above is inadequate and a high purification capacity may not be obtained.

<The Precious Metal Catalyst in the Lower Layer>

The palladium (Pd) present in the herein disclosed lower layer 50 is supported on a support that contains the previously described OSC material. There are no particular limitations on the amount of Pd supported, but this amount is suitably in the range from 0.01 mass % to 1 mass % (for example, 0.05 mass % to 0.5 mass %) with reference to the total mass of the support in the lower layer 50. An adequate catalytic activity is not obtained at less than this, while a saturation of the effect occurs and the cost becomes unfavorable when more than this is supported. There are no particular limitations on the method for supporting the Pd on the support in the lower layer 50. For example, production can be carried out by impregnating a powder of the OSC material-containing support with an aqueous solution containing a palladium salt (for example, the nitrate) and/or a palladium complex (for example, a tetraammine complex) followed by drying and calcination.

The herein disclosed lower layer 50 may contain another precious metal catalyst to the extent that the performance of the Pd is not impaired. The non-Pd precious metal catalyst can be exemplified by platinum (Pt), ruthenium (Ru), iridium (Ir), and osmium (Os).

The amount of lower layer 50 formation (the coating amount) is not particularly limited, but, for example, is preferably about 40 g to 200 g per 1 liter of volume of the honeycomb substrate 10. When the amount of lower layer 50 formation is too small, this may result in a weak function as a catalyst coating layer and may cause particle growth of the supported Pd. In addition, when the amount of lower layer 50 formation is too large, this may cause an increase in the pressure loss when the exhaust gas passes through the cells of the honeycomb substrate 10.

<The Upper Layer>

The upper layer 40 constituting the herein disclosed catalyst coating layer 30 is provided with a support and a precious metal catalyst containing at least Rh and Pd supported on this support. The Rh purifies mainly the NOx in the exhaust gas.

<The Support for the Upper Layer>

The support that supports the Rh in the upper layer 40 can contain a substance heretofore used as a support of this type, e.g., zirconia ($ZrO_2$), alumina ($Al_2O_3$), and their solid solutions and complex oxides. For example, a support containing $ZrO_2$ is preferred. Rh supported on $ZrO_2$ generates hydrogen by a hydrogen reforming reaction from the HC in the exhaust gas. The NOx in the exhaust gas is more completely purified by the reducing power of this hydrogen. The support that supports the Rh in the upper layer 40 preferably does not contain ceria ($CeO_2$).

The support that supports the Rh in the upper layer 40 preferably is a $ZrO_2$ complex oxide that contains $Y_2O_3$. The heat resistance of the $ZrO_2$ can be improved and the decline in purification capacity after high-temperature aging can be inhibited by having the $ZrO_2$ contain $Y_2O_3$. The $Y_2O_3$ content, expressed with reference to the total mass of the $Y_2O_3$-containing $ZrO_2$ complex oxide, is suitably generally 5 mass % to 20 mass % and preferably 6 mass % to 10 mass %. A high catalytic activity and high-temperature durability can be exhibited by the Rh-containing upper layer 40 when the $Y_2O_3$ content is brought into the indicated range.

Another compound (typically an inorganic oxide) may be mixed into this $ZrO_2$ complex oxide as an auxiliary component. For example, a rare-earth element such as lanthanum, an alkaline-earth element such as calcium, or a transition metal element can be used for this compound. Among these, a rare-earth element such as lanthanum is preferably used as a stabilizer from the standpoint of bringing about an increase in the specific surface area at elevated temperatures without poisoning the catalytic function. For example, a rare-earth oxide such as $La_2O_3$ or $Nd_2O_3$ may be admixed for the purpose of, for example, preventing sintering. This rare-earth oxide may be physically mixed as an independent oxide into the support powder or may be made a component of the complex oxide. The content (mass ratio) of the auxiliary component is preferably 2 mass % to 30 mass % (for example, 5 mass % to 15 mass %) of the support as a whole. There is little effect, e.g., an inhibition of sintering and so forth, when the content of the auxiliary component is too much below 2 mass %, while the amount of $ZrO_2$ in the support undergoes a relative decline at too much above 40 mass % and the catalytic activity may be reduced as a result.

The support that supports the Rh in the herein disclosed upper layer 40 may contain a support material other than the $ZrO_2$ complex oxide. A porous, highly heat-resistant metal oxide is preferably used for this support material. For example, the use of $Al_2O_3$ is preferred. $Al_2O_3$ has a smaller specific surface area and a higher durability (particularly heat resistance) than $ZrO_2$ complex oxide. As a consequence, supporting the Rh on $Al_2O_3$ can improve the thermal stability of the support as a whole and can bring about an optimal amount of Rh supported on the support as a whole. The $Al_2O_3$ and $ZrO_2$ complex oxide are preferably mixed at a mass mixing ratio ($Al_2O_3$:$ZrO_2$ complex oxide) in the range from 80:20 to 20:80.

<The Precious Metal Catalyst in the Upper Layer>

The Rh present in the herein disclosed upper layer 40 is supported on a support that contains the previously described $ZrO_2$ complex oxide. While the amount of supported Rh is not particularly limited, it is preferably brought into the range from 0.01 mass % to 1 mass % (for example, 0.05 mass % to 0.5 mass %) with reference to the total mass of the support that supports the Rh in the upper layer. A satisfactory catalytic activity is not obtained at less than this, while a saturation of the effect occurs and the cost becomes unfavorable when more than this is supported. There are no particular limitations on the method of supporting the Rh on the support in the upper layer 40. For example, production can be carried out by impregnating the powder of a support made of a $ZrO_2$ complex oxide with an aqueous solution containing a rhodium salt (for example, a nitrate) or a rhodium complex (for example, a tetraammine complex) and then drying and calcination.

As indicated above, the upper layer 40 of the herein disclosed catalyst coating layer 30 contains Pd in addition to Rh. The support that supports the Pd in the upper layer 40 can be the same as the support that supports the Pd in the lower layer 50 and is a support that contains an OSC material, e.g., a $CeO_2$—$ZrO_2$ complex oxide. Among the preceding, a support that is the same as the support for the Pd in the previously described lower layer 50 is particularly suitable and a detailed description thereof is therefore omitted.

The mass ratio (Rh/Pd) between the Rh and Pd in the upper layer 40 is suitably within the range generally of 1.25 to 5, preferably 1.25 to 4, more preferably 1.25 to 3, and particularly preferably 1.25 to 2. Because, according to this construction, the ratio between the Rh and Pd in the upper layer 40 resides in a favorable balance, an increase in the OSC can be reliably exhibited while alloying between the Rh and Pd is inhibited. When the Pd proportion is too large, a satisfactory NOx purification effect by the Rh may not be obtained due to alloying between the Rh and Pd; when, on the other hand, the Pd proportion is too short, the effect of improving the OSC becomes inadequate.

The herein disclosed upper layer 40 may contain another precious metal catalyst to the extent that the functionalities of the Rh and Pd are not impaired. The precious metal catalyst other than Rh and Pd can be exemplified by platinum (Pt), ruthenium (Ru), iridium (Ir), and osmium (Os).

The amount of upper layer 40 formation (the coating amount) is not particularly limited, but, for example, is preferably about 20 g to 200 g per 1 liter of volume of the honeycomb substrate 10. When the amount of upper layer 40 formation is too much less than 20 g, this may result in a weak function as a catalyst coating layer and may cause particle growth of the supported Rh and Pd. In addition, when the amount of upper layer 40 formation exceeds 200 g, this may cause an increase in the pressure loss when the exhaust gas passes through the cells of the honeycomb substrate 10.

<The Method of Forming the Catalyst Coating Layer>

With respect to the formation of the lower layer 50 of the catalyst coating layer 30, a slurry containing a powder of the support may be washcoated on the surface of the substrate (for example, a honeycomb substrate) 10 and the Pd may be supported thereon, or a catalyst powder may be prepared in advance by supporting Pd on a support powder and a slurry containing this catalyst powder may be washcoated on the surface of the substrate 10. With respect to the upper layer 40 of the catalyst coating layer 30, a slurry may be prepared by mixing a support powder on which Rh has been supported in advance and a support powder on which Pd has been supported in advance and washcoating this slurry on the surface of the lower layer 50.

In the process of forming the catalyst coating layer 30 by washcoating, a binder is preferably present in the slurry in order to bring about a favorable adherence of the slurry to the surface of the substrate 10 or the surface of the lower layer 50. For example, an alumina sol or silica sol is preferably used for this binder. The viscosity of the slurry may be adjusted as appropriate so the slurry can easily flow into the cells of the substrate (for example, a honeycomb substrate). The drying conditions for the slurry washcoated on the surface of the substrate 10 will vary with the shape and dimensions of the substrate or support, but are typically approximately 1 hour to 10 hours at approximately $$80° C. \text{ to } 120° C. \qquad [\text{Math. 15}]$$

(for example, $$100° C. \text{ to } 110° C.). \qquad [\text{Math. 16}]$$

The calcination conditions are approximately 2 hours to 4 hours at approximately $$400° C. \text{ to } 1000° C. \qquad [\text{Math. 17}]$$

(for example, $$500° C. \text{ to } 700° C.). \qquad [\text{Math. 18}]$$

Figure 3:
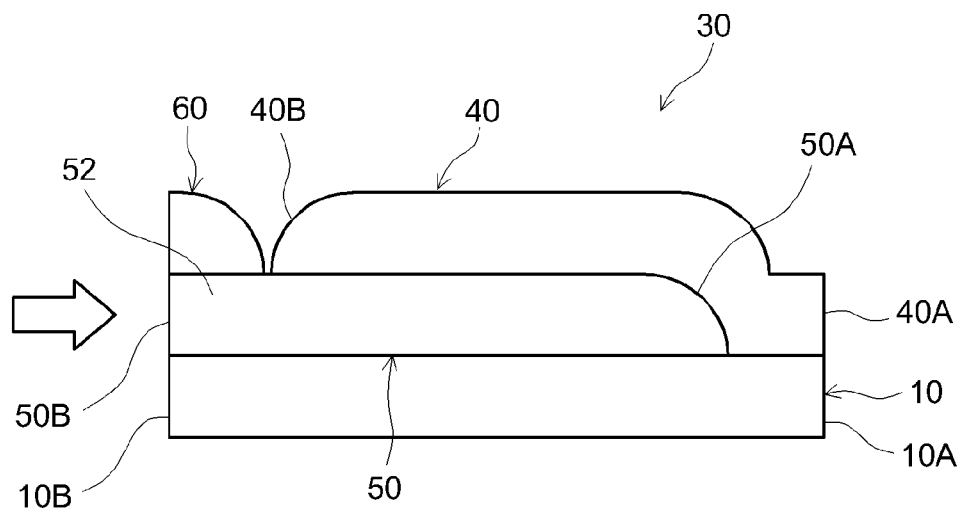
FIG. 3 is a diagram that schematically shows the structure of the rib wall region in an exhaust gas purification catalyst according to an embodiment of the present invention.

The layered structure of the catalyst coating layer 30 should have a catalyst layer containing Rh and Pd as described above for the upper layer 40 and a catalyst layer containing Pd as described above for the lower layer 50, but may be three or more layers containing another layer or layers (for example, a separate layer adjacent to the substrate) in addition to these two layers. Moreover, the catalyst coating layer 30 need not be an upper layer/lower layer two-layer structure in which the upper layer 40 and the lower layer 50 extend over the entire area of the substrate (for example, a honeycomb substrate) 10, and may have a structure in which a partial stacking occurs between a portion of the upper layer 40 and a portion of the lower layer 50. For example, as shown in FIG. 3, the upper layer 40 and the lower layer 50 may be stacked such that an end of one layer extends beyond an end of the other layer. In the example shown in FIG. 3, and considered with reference to the exhaust gas flow-through direction, stacking is carried out such that the downstream end 40A of the upper layer 40 extends beyond the downstream end 50A of the lower layer 50. Stacking is also carried out with the upstream end 50B of the lower layer 50 extending beyond the upstream end 40B of the lower layer 40. The upper layer 40 and the lower layer 50 preferably form an upper layer/lower layer two-layer structure over a region (range) that is more than 50% (for example, 70% to 80% or more) of the entire area of the substrate 10.

In the example shown in FIG. 3, a front-stage upper layer 60 is formed on the upstream side of the upper layer 40, which is the surface of the extension region 52 of the lower layer 50. In this embodiment, the front-stage upper layer 60 is provided with a support and, supported on this support, a precious metal catalyst that contains at least Pd. Poisons (particularly HC) in the exhaust gas can be very efficiently purified by disposing such a Pd-supporting front-stage upper layer 60 on the upstream side of the upper layer 40. Thus, because the front-stage upper layer 60 is on the top side (surface side), where the HC readily diffuses, and is disposed on the upstream side of the substrate 10, where high temperatures are readily achieved, a larger opportunity for contact between the Pd and exhaust gas is created and the exhaust gas can be very efficiently purified at high temperatures.

The support that supports the Pd in the front-stage upper layer 60 preferably contains an OSC material. In this embodiment, the support that supports the Pd in the front-stage upper layer 60 contains a $CeO_2$—$ZrO_2$ complex oxide. The $CeO_2$—$ZrO_2$ complex oxide may be a $CeO_2$—$ZrO_2$ complex oxide in which another compound (typically an inorganic oxide) is admixed as an auxiliary component. For example, a rare-earth element such as lanthanum, an alkaline-earth element such as calcium, or a transition metal element may be used for this compound. For example, a rare-earth oxide such as $La_2O_3$, $Y_2O_3$, or $Pr_6O_{11}$ may be admixed for the purpose of, for example, preventing sintering. The support that supports the Pd in the front-stage upper layer 60 may also contain $Al_2O_3$. In addition, barium (Ba) may be added to the support that supports the Pd in the front-stage upper layer 60.

The front-stage upper layer 60 is preferably formed over a region corresponding to 10% to 40% (for example, 15% to 25%) of the total length of the substrate 10 to the downstream side from the upstream end 10B of the substrate 10. The lower layer 50 is preferably formed over a region corresponding to 70% to 100% (for example, 85% to 95%) of the total length of the substrate 10 to the downstream side from the upstream end 10B of the substrate 10. The upper layer 40 is preferably formed over a region corresponding to 70% to 100% (for example, 75% to 85%) of the total length of the substrate 10 to the upstream side from the downstream end 10A of the substrate 10.

Several examples relating to the present invention are described below, but the present invention is not intended to be limited by the disclosures in these specific examples.

The exhaust gas purification catalyst of these examples is, as shown in FIG. 1, provided with a honeycomb substrate 10 that has a plurality of regularly arranged cells 12 and rib walls 14 that form the cells 12. The honeycomb substrate 10 is a cylinder with a length of 105 mm and a volume of 0.875 L and is made of cordierite; a catalyst coating layer 30 as shown in FIG. 3 is formed on the surfaces of the rib walls 14 that form the cells 12; and gas passages are formed in the spaces on these surfaces. The catalyst coating layer 30 is composed of a lower layer 50, an upper layer 40, and a front-stage upper layer 60.

The lower layer 50 contains Pd, $Al_2O_3$, $CeO_2$—$ZrO_2$ complex oxide, and barium. The upper layer 40 contains Rh, Pd, $Al_2O_3$, and $ZrO_2$ complex oxide. The front-stage upper layer 60 contains Pd, $Al_2O_3$, $CeO_2$—$ZrO_2$ complex oxide, and barium.

The front-stage upper layer 60 is formed, as shown in FIG. 1 and FIG. 3, over a region that corresponds to 20% of the total length of the honeycomb substrate to the downstream side from the upstream end of the honeycomb substrate. The lower layer 50 is formed over a region that corresponds to 90% of the total length of the honeycomb substrate to the downstream side from the upstream end of the honeycomb substrate. The upper layer 40 is formed over a region that corresponds to 80% of the total length of the honeycomb substrate to the upstream side from the downstream end of the honeycomb substrate.

The method of forming the exhaust gas purification catalyst of these examples is described in the following.

EXAMPLE 1

An exhaust gas purification catalyst was fabricated in Example 1 in which Rh was disposed in the upper layer and Pd was disposed in only the lower layer.

(1) Formation of the Lower Layer

A dispersion was prepared by suspending 75 g/L alumina ($Al_2O_3$) powder in a nitric acid-type Pd reagent solution that contained 0.82 g/L Pd. The following were mixed into this dispersion to obtain a slurry: a powder of a $CeO_2$—$ZrO_2$ complex oxide OSC material ($CeO_2$: 30 wt %, $ZrO_2$: 60 wt %, $Y_2O_3$: 5 wt %, $La_2O_3$: 5 wt %), 5 wt % barium acetate, 5 wt % $Al_2O_3$ binder, and distilled water. This slurry was dried for 30 minutes at $$120° C. \qquad [\text{Math. 19}]$$

and was calcined for 2 hours at $$500° C. \qquad [\text{Math. 20}]$$

to obtain a catalyst material for the lower layer.

This lower layer catalyst material was then dispersed in an aqueous acid solution to prepare a lower layer-forming slurry (A). Using this lower layer-forming slurry (A), a washcoat was executed on the region corresponding to 90% of the total length from the end on the upstream side of the honeycomb substrate, followed by drying and calcination to form a lower layer 50 on the surface of the substrate.

(2) Formation of the Upper Layer

A dispersion was prepared by suspending 65 g/L of a powder of a $ZrO_2$ complex oxide ($ZrO_2$: 80 wt %, $Y_2O_3$: 8 wt %, $Nd_2O_3$: 12 wt %) in a nitric acid-type Rh reagent solution that contained 0.2 g/L Rh. The following were mixed into this dispersion to obtain an upper layer-forming slurry (B): 25 g/L $Al_2O_3$ powder, 5 wt % $Al_2O_3$ binder, and distilled water. Using this upper layer-forming slurry (B), a washcoat was executed on the region corresponding to 80% of the total length from the other, downstream end (the end opposite from the end for formation of the lower layer) of the honeycomb substrate 10, followed by drying and calcination to form an upper layer 40 on the surface of the substrate.

(3) Formation of the Front-Stage Upper Layer

A dispersion was prepared by suspending 50 g/L alumina ($Al_2O_3$) powder in a nitric acid-type Pd reagent solution that contained 1.0 g/L Pd. The following were mixed into this dispersion to obtain a slurry: a powder of a $CeO_2$—$ZrO_2$ complex oxide OSC material ($CeO_2$: 60 wt %, $ZrO_2$: 30 wt %, $La_2O_3$: 3 wt %, $Pr_6O_{11}$: 7 wt %), 5 wt % barium acetate, 5 wt % $Al_2O_3$ binder, and distilled water. This slurry was dried for 30 minutes at $$120° C. \qquad [\text{Math. 21}]$$

and was calcined for 2 hours at $$500° C. \qquad [\text{Math. 22}]$$

to obtain a catalyst material for the front-stage upper layer.

This catalyst material for the front-stage upper layer was then dispersed in an acidic aqueous solution to prepare a slurry (C) for forming the front-stage upper layer. Using this slurry (C) for forming the front-stage upper layer, a washcoat was executed on the region corresponding to 20% of the total length from the end on the upstream side of the honeycomb substrate, followed by drying and calcination to form a front-stage upper layer 60 on the surface of the substrate.

EXAMPLES 2 TO 5

Exhaust gas purification catalysts were prepared in Examples 2 to 5 in which Rh was disposed in the upper layer and Pd was disposed in both the upper layer and the lower layer. Specifically, a specific amount of the lower layer catalyst material was subtracted from the lower layer-forming slurry (A) described above and this same amount of lower layer catalyst material was mixed into the upper layer-forming slurry (B). The slurry (C) for forming the front-stage upper layer was prepared as in Example 1. Proceeding as in Example 1, these three slurries (A), (B), and (C) were washcoated on the substrate and dried and calcined to produce the exhaust gas purification catalyst. This production was carried out so as to provide 0.04 g, 0.08 g, 0.16 g, and 0.24 g for the amount of Pd in the upper layer as a whole for the sequence of Examples 2 to 5, respectively. The amount of Pd in the catalyst as a whole was held constant at 0.65 g.

EXAMPLE 6

An exhaust gas purification catalyst was fabricated in Example 6 in which Rh was disposed in the upper layer and Pd was disposed in both the upper layer and the lower layer. However, in this example the Pd in the upper layer was disposed therein without being supported on a support. Specifically, a specific amount of Pd (without support) was subtracted from the lower layer-forming slurry (A) indicated above and this same amount of Pd (without support) was mixed into the upper layer-forming slurry (B). The slurry (C) for forming the front-stage upper layer was prepared as in Example 1. Proceeding as in Example 1, these three slurries (A), (B), and (C) were washcoated on the substrate and dried and calcined to produce the exhaust gas purification catalyst. This production was carried out so as to provide 0.16 g for the amount of Pd in the upper layer as a whole.

The following are given in Table 1 for the exhaust gas purification catalysts according to Examples 1 to 6: the amount of Pd in the upper layer, the amount of $Al_2O_3$ in the upper layer, the amount of Pd in the lower layer, the amount of $Al_2O_3$ in the lower layer, and the mass ratio of the amount of Pd in the upper layer to the amount of Pd in the lower layer.

(4) Durability Testing

Durability testing was carried out on the exhaust gas purification catalysts of Examples 1 to 6 obtained as described above. In this durability testing, the exhaust gas purification catalyst from the particular example was installed in the exhaust system of a V8 engine and the V8 engine was placed in operation and maintained in operation for 50 hours at a catalyst bed temperature of $$1000° C. \qquad [Math. 23]$$

(5) OSC Evaluation Testing

Figure 4:
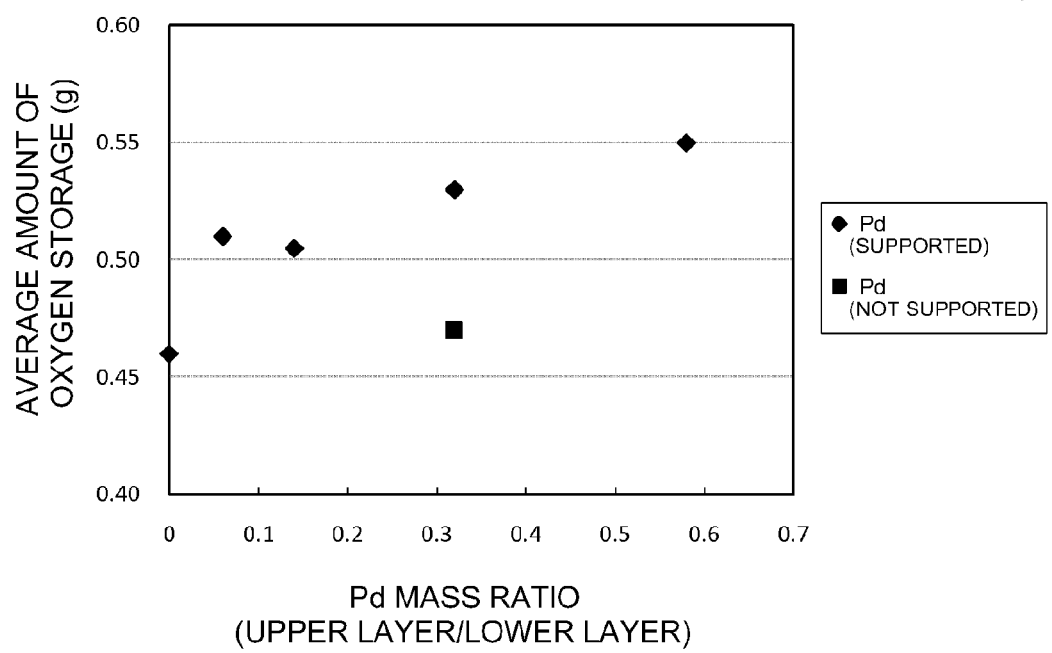
FIG. 4 is a graph that shows the relationship between the Pd mass ratio (upper layer/lower layer) and the average amount of oxygen storage.

The oxygen storage capacity (OSC) of each of the exhaust gas purification catalysts from Examples 1 to 6 was evaluated after the durability testing described above. Specifically, the exhaust gas purification catalyst was removed from the V8 engine after the durability testing and was installed in the exhaust gas system of a straight 4-cylinder engine. An $O_2$ sensor was placed downstream from the particular sample. While periodically switching the air/fuel ratio A/F of the mixed gas fed to the straight 4-cylinder engine between rich and lean according to a prescribed time schedule, the average amount of oxygen storage of the particular exhaust gas purification catalyst was calculated from the behavior lag of the $O_2$ sensor. The results are given in FIG. 4. FIG. 4 is a graph of the relationship between the Pd mass ratio (upper layer/lower layer) and the amount of oxygen storage.

As shown in FIG. 4, the exhaust gas purification catalysts of Examples 2 to 5, in which Pd was disposed in both the upper layer and the lower layer, had a clearly larger amount of oxygen storage than the exhaust gas purification catalyst of Example 1, in which Pd was disposed in only the lower layer. In addition, a comparison of Examples 2 to 5 demonstrates a trend of an increasing amount of oxygen storage accompanying an increase in the Pd mass ratio between the upper layer and lower layer (upper layer/lower layer). In the case of the exhaust gas purification catalysts tested here, a large amount of oxygen storage, i.e., of at least 0.5 g, could be exhibited by bringing the Pd mass ratio (upper layer/lower layer) to at least 0.06. In particular, a very large amount of oxygen storage, i.e., of at least 0.53 g, could be realized by bringing the Pd mass ratio (upper layer/lower layer) to at least 0.3. Viewed from the perspective of raising the OSC of the catalyst, a Pd mass ratio (upper layer/lower layer) generally of at least 0.06 is suitable while at least 0.15 is preferred and at least 0.2 is particularly preferred. As compared to Examples 2 to 5, a satisfactory improvement in the OSC was not obtained with the exhaust gas purification catalyst of Example 6, in which the Pd was disposed in the upper layer without being supported on a support. The Pd is thus preferably disposed in the upper layer supported on a support.

TABLE 1

| | amount of Pd in upper layer (g) | amount of Pd in lower layer (g) | amount of $Al_2O_3$ in upper layer (g) | amount of $Al_2O_3$ in lower layer (g) | Pd mass ratio (upper layer/lower layer) |
|---|---|---|---|---|---|
| Example 1 | 0 | 0.65 | 0 | 59 | 0 |
| Example 2 | 0.04 | 0.61 | 4 | 55 | 0.06 |
| Example 3 | 0.08 | 0.57 | 8 | 51 | 0.14 |
| Example 4 | 0.16 | 0.49 | 16 | 43 | 0.32 |
| Example 5 | 0.24 | 0.41 | 24 | 35 | 0.58 |
| Example 6 | 0.16 | 0.49 | 0 | 59 | 0.32 |

(6) NOx Purification Testing

The exhaust gas purification catalysts of Examples 1 to 6 were submitted after the above-described durability testing to an evaluation of the NOx purification capacity. Specifically, after the durability testing, the exhaust gas purification catalyst was installed in the exhaust system of a straight 4-cylinder engine; exhaust gas at a gas inlet temperature of $$550°\ C.\qquad\qquad\text{[Math. 24]}$$

Figure 5:
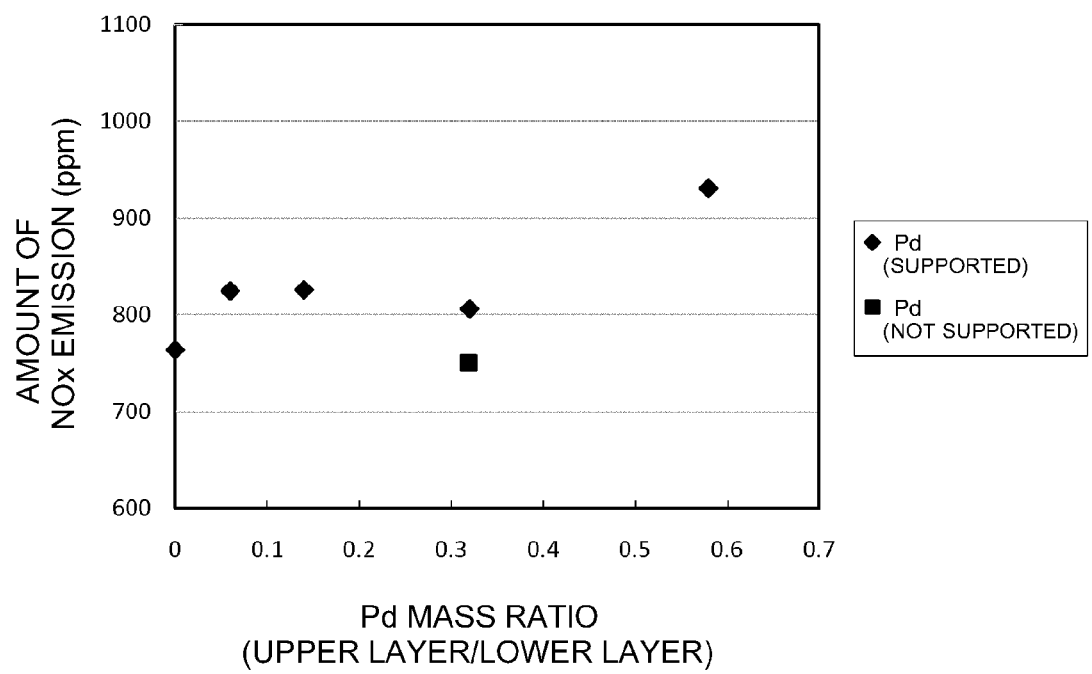
FIG. 5 is a graph that shows the relationship between the Pd mass ratio (upper layer/lower layer) and the amount of NOx emission.

(catalyst bed temperature of $$600°\ C.\ \text{to}\ 630°\ C.)\qquad\qquad\text{[Math. 25]}$$

was passed through the catalyst; and lean control at A/F=15.1 was carried out followed by switching to rich control at A/F 14.1. The amount of NOx emission was measured at 2 minutes after switching to the rich control at A/F=14.1. The results are shown in FIG. 5. FIG. 5 is a graph that shows the relationship between the Pd mass ratio (upper layer/lower layer) and the amount of NOx emission.

As shown in FIG. 5, the amount of NOx emission for the exhaust gas purification catalyst of Example 5, in which the Pd mass ratio (upper layer/lower layer) had been brought to 0.58, was increased over that of the other samples. It is assumed here that the NOx purification capacity of the Rh has been diminished due to alloying between the Pd and Rh in the upper layer. Viewed from the perspective of maintaining a high NOx purification capacity for the Rh, the Pd mass ratio (upper layer/lower layer) is suitably generally not more than 0.4 and preferably is not more than 0.32 and particularly preferably is not more than 0.25. Viewed from the perspective of satisfying both the NOx purification capacity and the OSC, the Pd mass ratio (upper layer/lower layer) is generally suitably at least 0.01 and not more than 0.4, is preferably at least 0.06 and not more than 0.32, is more preferably at least 0.15 and not more than 0.35, and particularly preferably is at least 0.2 and not more than 0.3.

Specific examples of the present invention have been described in detail above, but these are nothing more than examples and do not limit the claims. The art described in the claims encompasses various adjustments and modifications of the specific examples provided as examples above.

INDUSTRIAL APPLICABILITY

The herein disclosed exhaust gas purification catalyst can provide an exhaust gas purification catalyst in which the OSC of the catalyst as a whole is effectively increased while a high NOx purification capacity is maintained.

The invention claimed is:

1. An exhaust gas purification catalyst comprising a substrate and a catalyst coating layer on a surface of the substrate, wherein the catalyst coating layer comprises a layered structure having upper and lower layers with the lower layer being closer to the surface of the substrate and the upper layer being relatively farther therefrom, the catalyst coating layer is provided with Rh and Pd as precious metal catalysts, the catalyst coating layer is provided with an OSC material having an oxygen storage capacity as a support, the Rh is disposed in the upper layer of the catalyst coating layer, the Pd is disposed in both the upper layer and the lower layer of the catalyst coating layer, the support that supports the Rh in the upper layer is made of a $ZrO_2$ complex oxide that contains $Y_2O_3$, at least a portion of the Pd in the upper layer and in the lower layer is supported on the OSC material, a mass ratio of the Pd disposed in the upper layer to the Pd disposed in the lower layer is at least 0.01 and not more than 0.4, each of the lower layer and the upper layer has an upstream end with respect to an exhaust gas flow-through direction, the upstream end of the lower layer includes an extension region that extends beyond the upstream end of the upper layer, a front-stage upper layer is disposed on a portion of the surface of the extension region of the lower layer, the portion corresponding to 10% to 40% of the total length of the substrate from the upstream to the downstream thereof, and the front-stage upper layer is provided with a support and contains an OSC material, and Pd is supported on the support.

2. The exhaust gas purification catalyst according to claim 1, wherein the OSC material supporting at least a portion of the Pd in the upper layer and in the lower layer is made of $CeO_2$ or a $CeO_2$—$ZrO_2$ complex oxide.

3. The exhaust gas purification catalyst according to claim 1, wherein a mass ratio of the Rh to the Pd disposed in the upper layer is 1.25 to 5.

4. The exhaust gas purification catalyst according to claim 1, wherein the mass ratio of the Pd disposed in the upper layer to the Pd disposed in the lower layer is 0.06 to 0.32.

5. The exhaust gas purification catalyst according to claim 1, wherein the support that supports the Rh contains a $ZrO_2$ complex oxide that contains $Y_2O_3$ and $Nd_2O_3$, and the OSC material that supports the at least a portion of the Pd contains a $CeO_2$—$ZrO_2$ complex oxide that contains $La_2O_3$ and $Pr_6O_{11}$.

\* \* \* \* \*